(12) United States Patent
Iizuka et al.

(10) Patent No.: US 12,188,811 B2
(45) Date of Patent: Jan. 7, 2025

(54) ELECTRONIC BALANCE

(71) Applicant: SHIMADZU CORPORATION, Kyoto (JP)

(72) Inventors: Atsushi Iizuka, Kyoto (JP); Masayuki Kawai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 400 days.

(21) Appl. No.: 17/864,402

(22) Filed: Jul. 14, 2022

(65) Prior Publication Data

US 2023/0017252 A1    Jan. 19, 2023

(30) Foreign Application Priority Data

Jul. 16, 2021    (JP) .................................. 2021-118318

(51) Int. Cl.
*G01G 21/28*    (2006.01)
(52) U.S. Cl.
CPC .................. *G01G 21/286* (2013.01)
(58) Field of Classification Search
CPC ..... G01G 21/286; G01G 21/28; E05F 15/635; E05Y 2999/00
USPC ........................................................ 177/213
See application file for complete search history.

(56) References Cited

U.S. PATENT DOCUMENTS

| | | | |
|---|---|---|---|
| 4,700,793 A | 10/1987 | Luchinger | |
| 4,789,034 A * | 12/1988 | Luchinger | G01G 21/283 49/25 |
| 4,798,250 A | 1/1989 | Knothe et al. | |
| 4,979,579 A * | 12/1990 | Dardat | G01G 23/3728 177/180 |
| 5,058,692 A * | 10/1991 | Melcher | G01G 21/286 177/238 |
| 6,246,018 B1 | 6/2001 | Schink | |

(Continued)

FOREIGN PATENT DOCUMENTS

| | | |
|---|---|---|
| CH | 667921 | 11/1988 |
| CH | 669257 | 2/1989 |

(Continued)

OTHER PUBLICATIONS

Ohaus, "Explorer Semi-Micro Balances", accessed on Jun. 4, 2021, with English translation thereof, Available at: https://japan.ohaus.com/ja-JP/ExplorerSemi-MicroBalances-18.

(Continued)

*Primary Examiner* — Jacques M Saint Surin
(74) *Attorney, Agent, or Firm* — JCIPRNET

(57) ABSTRACT

An electronic balance includes a balance unit having a measuring pan surrounded by a space enclosed within a windshield having a door, and a rear-section casing formed by plates and containing a motor unit which includes a motor and a driving element connected with the rotation shaft of the motor. When the motor unit is fixed within the rear-section casing, the driving element protrudes through a driving-element hole in one of the plates to the outside of the rear-section casing and engages with a driven element fixed to the door so that the door can be opened and closed by the motor. When the motor must be replaced, the motor unit including the motor and the driving element in an integrated form can be entirely and easily replaced with a new motor unit.

6 Claims, 11 Drawing Sheets

(56) References Cited

U.S. PATENT DOCUMENTS

| | | | |
|---|---|---|---|
| 7,544,903 B2* | 6/2009 | Hamamoto | G01G 21/286 |
| | | | 177/180 |
| 10,989,506 B1* | 4/2021 | Huang | F42B 6/003 |
| 11,002,592 B2* | 5/2021 | Buchmann | G01G 21/23 |

FOREIGN PATENT DOCUMENTS

| | | |
|---|---|---|
| EP | 0216035 | 4/1987 |
| JP | 2000146681 | 5/2000 |

OTHER PUBLICATIONS

"Office Action of India Counterpart Application", issued on Feb. 10, 2023, with English translation thereof, p. 1-6.

* cited by examiner

ELECTRONIC BALANCE

CROSS REFERENCE TO RELATED APPLICATIONS

This application claims the priority benefit of Japanese Patent Application No. 2021-118318, filed on Jul. 16, 2021. The entirety of the above-mentioned patent application is hereby incorporated by reference herein and made a part of this specification.

TECHNICAL FIELD

The present invention relates to an electronic balance.

BACKGROUND ART

Electronic balances are used in laboratories or similar locations to measure the mass (weight) of a powder sample or other types of specimens. This type of electronic balance has a windshield surrounding a measuring pan in order to shield the pan from an influence of a convection or other factors in the measurement environment. This windshield is provided with a door that can be opened and closed. When using this type of electronic balance, the user initially opens the door, places a specimen on the placement surface of the measuring pan of the electronic balance and closes the door. After reading the weight value of the specimen on the display section, the user opens the door of the windshield and removes the specimen.

Some of the conventional balances require the user to manually open and close the door of the windshield. On the other hand, the electronic balances described in Patent Literature 1 and Non Patent Literature 1 have a door open-close mechanism configured to automatically open and close the door. A door open-close mechanism normally includes a motor, a pinion gear, and a rack gear. The pinion gear is connected with the rotation shaft of the motor via a gear system or other types of transmission. The rack gear is fixed to the door and engaged with the pinion gear. When a predetermined operational action is performed by a user, such as the pressing of an operation button or the touching of the handle which is attached to the door (and is equipped with a sensor that senses an object touching the handle), the motor is activated and begins to rotate the pinion gear, which makes the rack gear linearly move, whereby the door is opened or closed.

CITATION LIST

Patent Literature

Patent Literature 1: JP 2000-146681 A

Non Patent Literature

Non Patent Literature 1: Explorer Semi-Micro Balances, OHAUS, [accessed on Jun. 4, 2021], the Internet While an electronic balance having this type of automatic door is used for a long period of time, the motor may break down. The situation in which the motor does not work and cannot automatically open and close the door is inconvenient for the user, so it is urgent to repair the motor. However, transporting the entire electronic balance to a factory or similar location for the repair or replacement of the motor requires a considerable amount of time until the repair or replacement can be completed. Furthermore, the vibrations which act on the electronic balance during the transportation may possibly lower the quality of the weighing mechanism of the balance.

Alternatively, a new motor may be transported to the location where the electronic balance is used, thereby allowing the task of replacing the motor to be carried out by an appropriate individual, such as the users themselves or a serviceperson from a shop (or agent) which sold the electronic balance to the user. This method not only shortens the period of time required for the completion of the task, but also eliminates the necessity to transport the entire electronic balance. However, the motor and the pinion gear are contained in the casing of the electronic balance, and this casing also contains other devices. Within such a crammed casing, it is not easy for the user to perform the tasks of removing the old motor, attaching the new motor, and connecting the motor with the pinion gear. Additionally, it is impossible for an agent in a developing country to give satisfactory training to servicepersons, so that it is difficult to let them take charge of the complex replacement work. Therefore, a device which can be repaired by even insufficiently trained servicepersons has been needed.

The problem to be solved by the present invention is to enable easy replacement of a motor included in a door open-close mechanism in an electronic balance having an automatic door.

SUMMARY OF INVENTION

An electronic balance according to the present invention developed for solving the previously described problem includes:

a balance unit including a bottom casing and a measuring pan provided on the top surface of the bottom casing;

a windshield including a front-side plate, a left-side plate, a right-side plate and a top-side plate enclosing a space around the measuring pan, the windshield having a door which is moveable in the front-back direction in the left-side plate, the right-side plate or the top-side plate;

a rear-section casing located at the back of the space, the rear-section casing including a rear-section front plate, a rear-section left plate extending from the left-side plate, a rear-section right plate extending from the right-side plate, and a rear-section top plate extending from the top-side plate, where the rear-section front plate covers the back side of the space, and where a driving-element hole and a joining-portion access hole are formed in the rear-section left plate, the rear-section right plate or the rear-section top plate that corresponds to the left-side plate, the right-side plate or the top-side plate in which the door is provided;

a motor unit including a motor, a driving element connected with the rotation shaft of the motor, and a joining portion which is fixed relative to the main body of the motor, where the motor unit is configured to be removably arranged within the rear-section casing so that the driving element protrudes through the driving-element hole to the outside of the rear-section casing while the joining portion is located at a position corresponding to the joining-portion access hole; and a driven element fixed to the door and configured to be driven by the driving element in the front-back direction.

In the electronic balance according to the present invention, a motor unit which includes a motor and a driving element (e.g., a pinion gear) in an integrated form is attached to the rear-section casing of the electronic balance. When the motor has broken down, the motor unit including the old motor and the old driving element can be entirely removed from the rear-section casing, and a new motor unit including a new motor and a new driving element in an integrated form can be entirely attached to the rear-section casing. Thus, the replacement of the motor can be easily performed.

DESCRIPTION OF EMBODIMENTS

An embodiment of the electronic balance according to the present invention is hereinafter described using FIGS. 1-11.

(1) Configuration of Electronic Balance According to Present Embodiment

Figure 1:
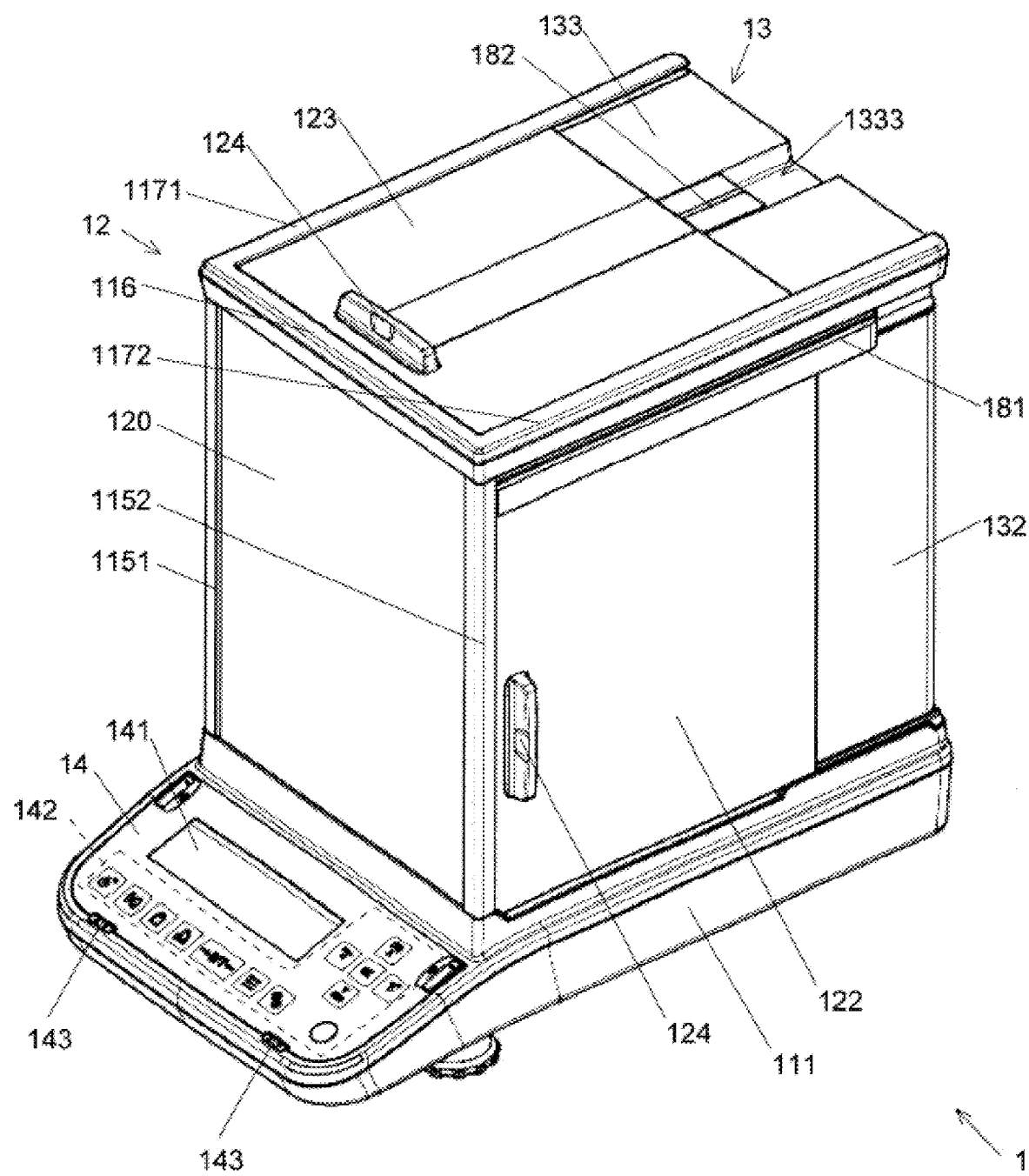
FIG. 1 is a perspective view showing an external appearance of one embodiment of the electronic balance according to the present invention.
Figure 2:
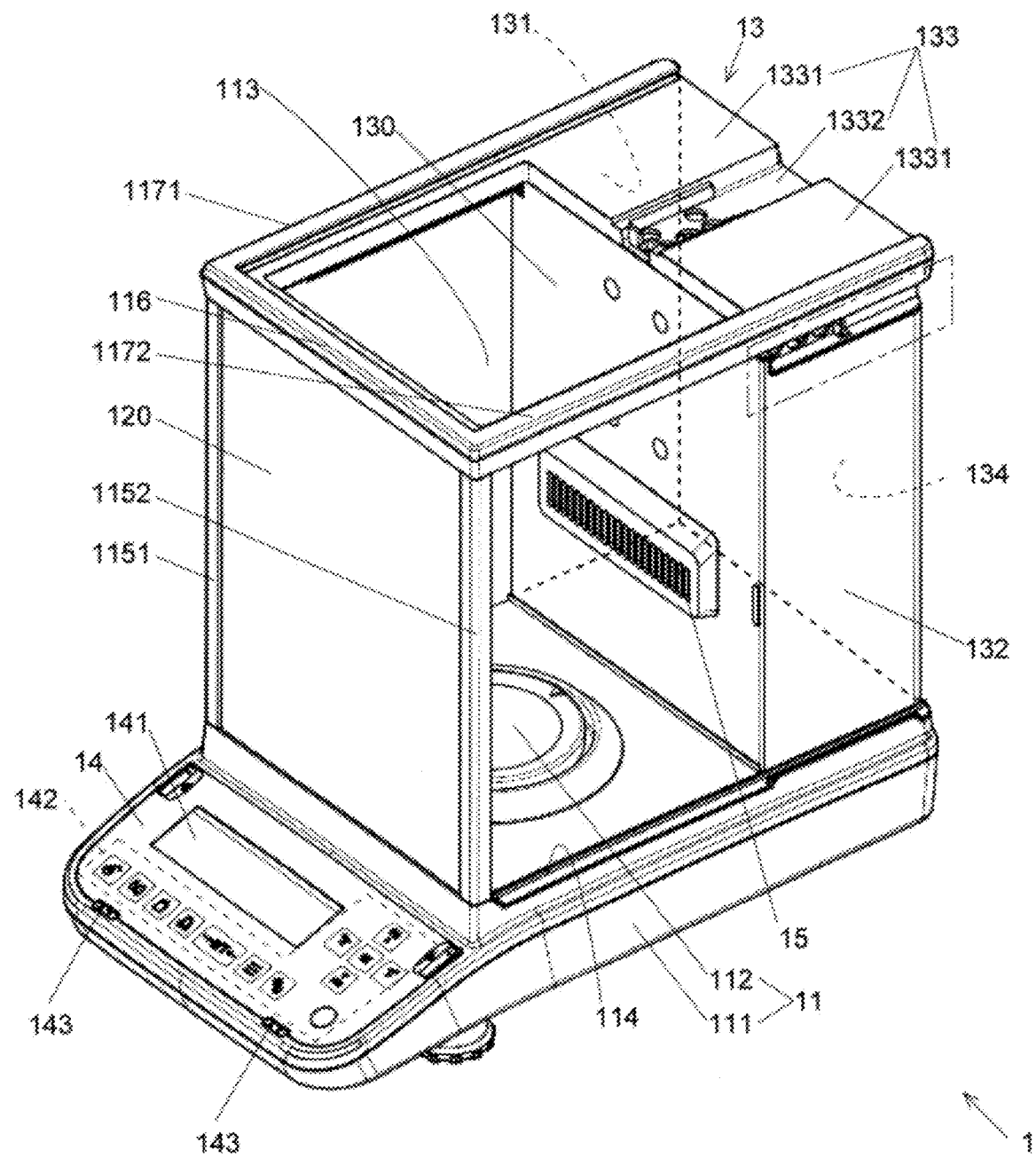
FIG. 2 is a perspective view of the electronic balance according to the present embodiment, with the left door, right door and top door removed.
Figure 3:
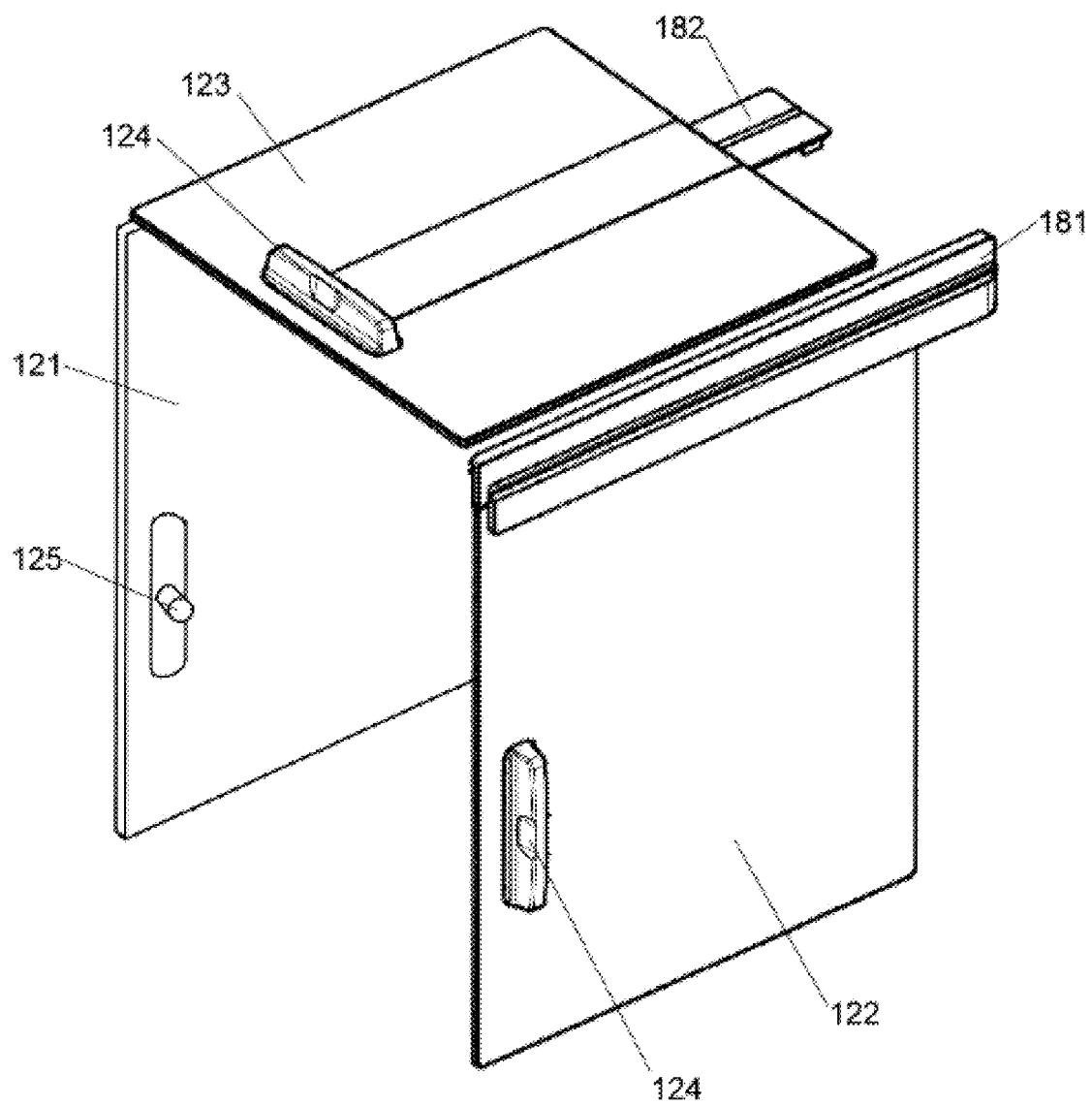
FIG. 3 is a perspective view of the left door, right door and top door removed from the electronic balance according to the present embodiment.

As shown in FIGS. 1 and 2, the electronic balance 1 according to the present embodiment includes a balance unit 11, windshield 12, rear-section casing 13 and console 14. It should be noted that FIG. 2 shows the same electronic balance 1 as shown in FIG. 1, with the left door 121, right door 122 and top door 123 (which will be described later) removed.

The balance unit 11 includes a bottom casing 111 and a measuring pan 112 (see FIG. 2) provided on the top surface of the bottom casing 111. The bottom casing 111 contains a weighing mechanism. The weighing mechanism in the electronic balance 1 according to the present embodiment is identical to those used in conventional electronic balances, and therefore, detailed descriptions of the mechanism will be omitted.

On the upper surface of the bottom casing 111, a left front pillar 1151 and a right front pillar 1152 are vertically provided at the left front and right front ends of the front area of a space 113 around the measuring pan 112. A front frame 116 horizontally extends like a bridge connecting the upper end of the left front pillar 1151 and that of the right front pillar 1152. A left frame 1171 and a right frame 1172 horizontally extend from the two ends of the front frame 116 to the rear-section casing 13 (which will be described later), respectively. The front frame 116, left frame 1171 and right frame 1172 are integrally formed with a rear-section top plate 133 of the rear-section casing 13 (see FIG. 2). As for the material of the front frame 116, left frame 1171, right frame 1172 and rear-section top plate 133, a resin or die-casting material can be used.

The windshield 12 has a front-side plate 120, left door 121, right door 122 and top door 123 enclosing the space 113 around the measuring pan 112. The "right" and "left" in the present context means the "right" and "left" sides of the space 113 and the measuring pan 112 as viewed from the front-side plate 120. Each of the front-side plate 120, left door 121, right door 122 and top door 123 is a transparent plate member (e.g., acrylic board). The front-side plate 120 is fixed by being vertically clamped by the top surface of the bottom casing 111 and the front frame 116. The left front pillar 1151 is provided for closing the gap which would otherwise be present between the front-side plate 120 and the left door 121 even when the left door 121 is closed. Similarly, the right front pillar 1152 is provided for closing the gap which would otherwise be present between the front-side plate 120 and the right door 122 even when the right door 122 is closed. The left and right front pillars 1151 and 1152 are not used to hold the front-side plate 120 or reinforce the windshield 12.

The left door 121 is moveable in the front-back direction along the guide grooves formed at the left end of the upper surface of the bottom casing 111 and on the lower surface of the left frame 1171. Similarly, the right door 122 is moveable in the front-back direction along the guide grooves formed at the right end of the upper surface of the bottom casing 111 and on the lower surface of the right frame 1172. The top door 123 is moveable in the front-back direction along the guide grooves formed on the right surface of the left frame 1171 and on the left surface of the right frame 1172. In FIG. 2, the guide groove 114 formed at the right end of the top surface of the bottom casing 111 is shown, while the other guide grooves are omitted. The space 113 becomes open when the left door 121, right door 122 or top door 123 is slid backward. In the present embodiment, the left door 121 forms the entire left-side plate, the right door 122 forms the entire right-side plate, and the top door 123 forms the entire top-side plate.

The left door 121, right door 122 and top door 123 are each provided with a handle 124 on the outside of the space 113 as well as a stopper 125 (see FIG. 3) located at the back of the handle 124 (within the space 113). The stopper 125 has a male screw, which is screwed into a threaded hole formed in the handle 124 through a hole formed in each door. The stopper 125 comes in contact with the rear-section casing 13 when the corresponding door is slid backward, thereby serving to prevent the door from being further opened (and ultimately coming off). For the replacement of a motor unit 16 (which will be described later), the corresponding door can be removed from the electronic balance 1 by sliding the door backward after removing the stopper 125 from the door.

Figure 4:
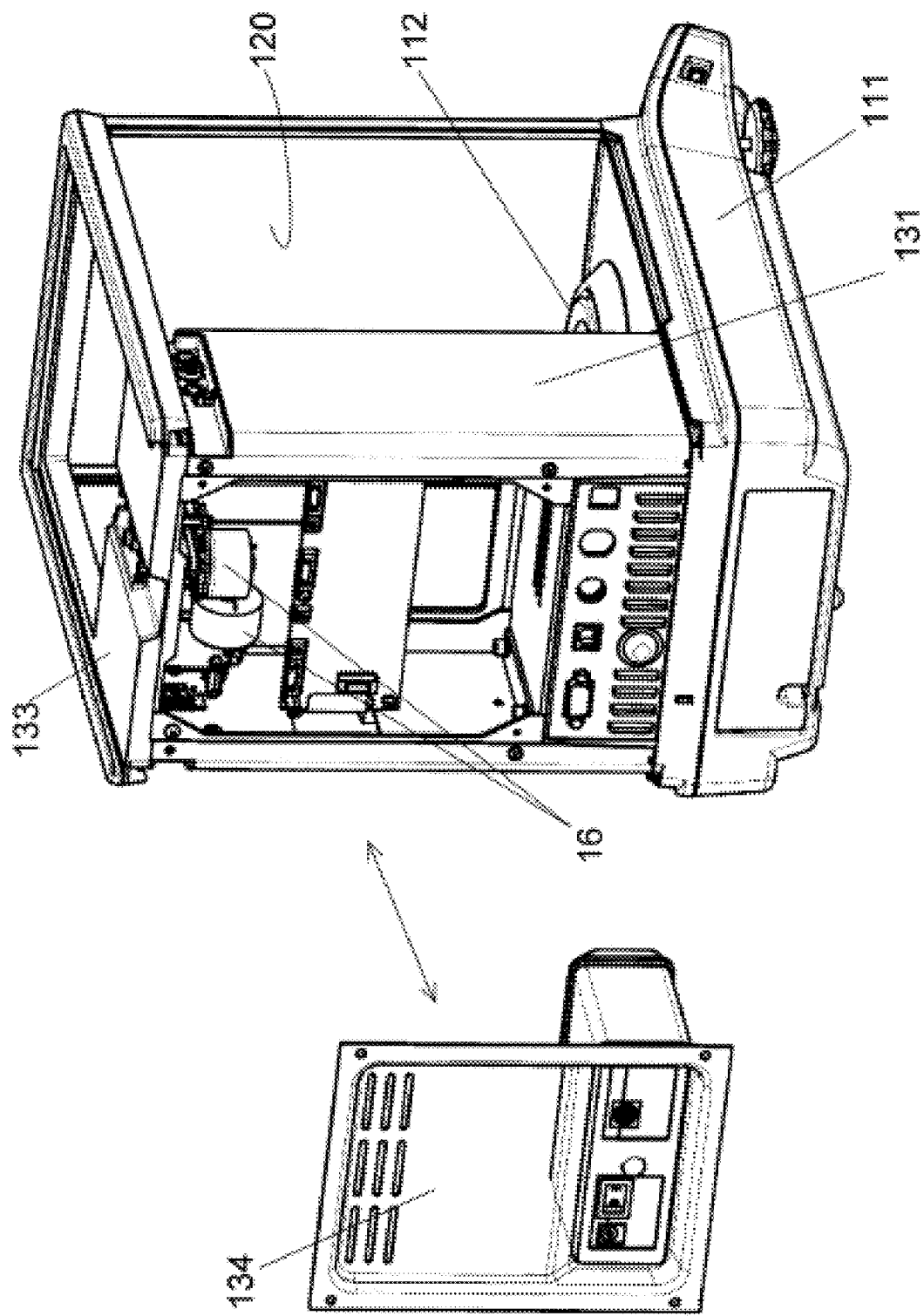
FIG. 4 is a perspective view of the rear-section casing, with the rear-section back plate removed.

The rear-section casing 13 is a rectangular parallelopiped casing located at the back of the space 113. It has a rear-section front plate 130, rear-section left plate 131, rear-section right plate 132, rear-section top plate 133 and rear-section back plate 134. The rear-section front plate 130 serves to cover the back side of the space 113. A static eliminator 15 for removing the static electricity which occurs within the space 113 is attached to the rear-section front plate 130. The rear-section back plate 134 is attachable to and removable from the other plates of the rear-section casing 13. FIG. 4 shows the rear-section back plate 134 removed from the other plates of the rear-section casing 13. The rear-section casing 13 contains a portion of the static eliminator 15, motor units 16 (which will be described later), a power unit and other devices. Although two motor units 16 are shown in FIG. 4, there is actually one more motor unit 16 behind the rear-section left plate 131 (accordingly, a total of three motor units 16).

Figure 5:
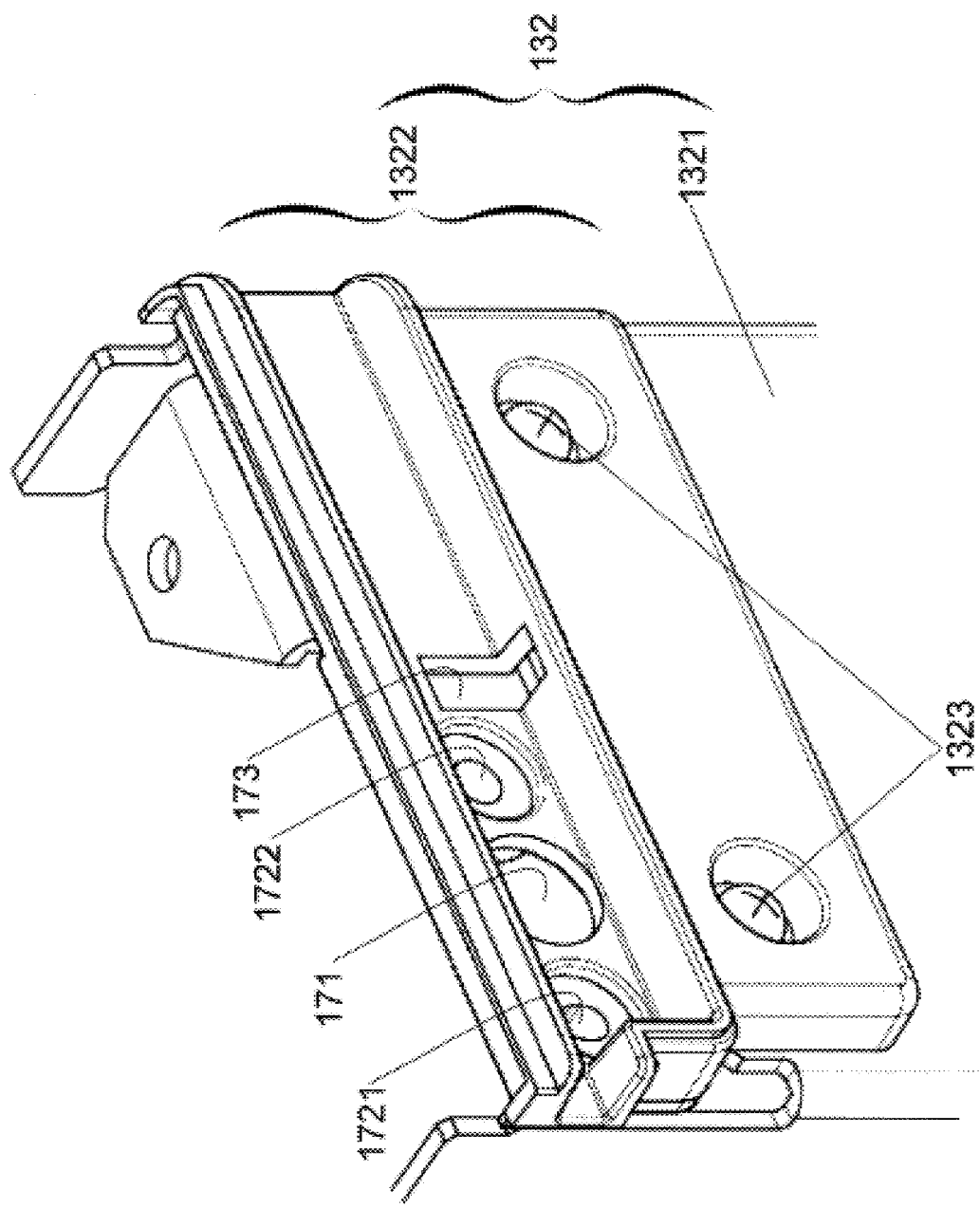
FIG. 5 is a perspective view of the section surrounded by the long dashed short dashed line in FIG. 2.

As shown in FIG. 5 (which is an enlarged view of the section surrounded by the long dashed short dashed line in FIG. 2), the rear-section left plate 131 and the rear-section right plate 132 each have a metal-plate part 1321 made of a metal (aluminum die casting) and a damping member 1322 made of resin fixed to the upper end of the metal-plate part 1321 with screws 1323 (although FIG. 5 only shows the metal-plate part 1321 and other elements provided for the rear-section right plate 132). The rear-section top plate 133 (FIG. 2) is provided with right and left metal-plate parts 1331 made of a metal (aluminum alloy or aluminum die casting) with a damping member 1332 made of resin sandwiched in between.

The reason for the use of the metal plate (metal-plate part 1321) in the lower portion of the rear-section left plate 131 and that of the rear-section right plate 132 is to secure the rigidity of the rear-section casing 13 and to provide a path for removing the static electricity which occurs in the driving system. Since this metal plate is comparatively thin, vibrations of the motor 161 (which will be described later) would possibly be transmitted to the metal plate and cause a considerable amount of noise if the motor 161 were directly attached to a position near the upper end of the metal plate.

The damping members 1322 and 1332 are thicker than the metal-plate parts 1321 and 1331. However, the use of the thicker damping members 1322 and 1332 does not cause a significant increase in weight since the mass density of the resin is lower than that of the metal (aluminum die casting). The thick damping members 1322 and 1332 made of resin are less likely to transmit vibrations caused by the motor 161 than the metal-plate parts 1321 and 1331.

The damping member 1322 includes one driving-element hole 171, a first joining-portion access hole 1721 and a second joining-portion access hole 1722 arranged in the front-back direction, with the driving-element hole 171 in between, as well as one sensor hole 173 located at a closer position to the back side than the three aforementioned holes (FIG. 5). The damper members of the rear-section right plate 132 and the rear-section top plate 133 also have one driving-element hole, two joining-portion access holes and one sensor hole arranged in a similar manner.

Figure 6:
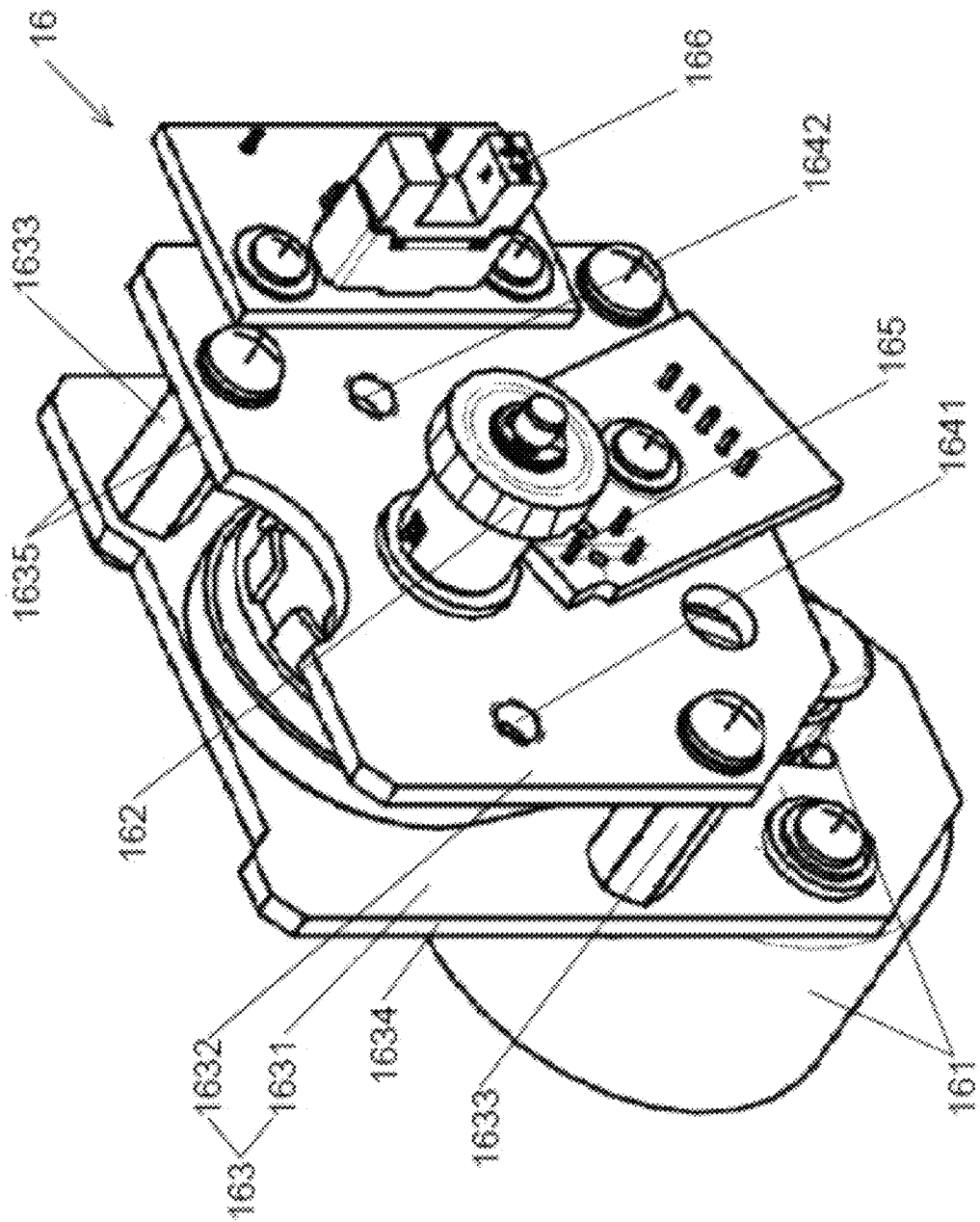
FIG. 6 is a perspective view of the motor unit included in the electronic balance according to the present embodiment.
Figure 7:
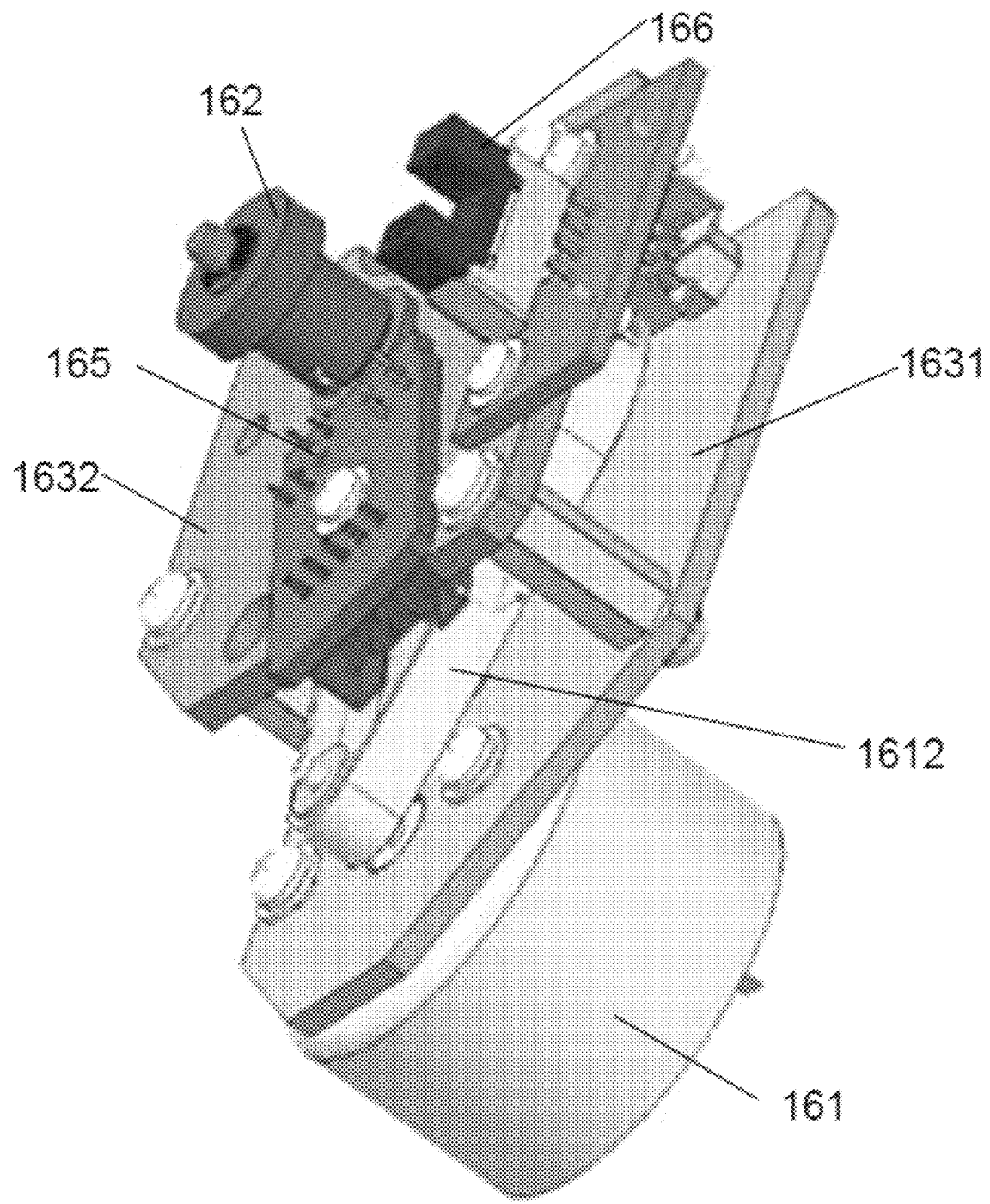
FIG. 7 is a perspective view of the same motor unit observed from an angle different from FIG. 6.

One motor unit 16 is attached to each of the rear-section left plate 131, rear-section right plate 132 and rear-section top plate 133. As shown in FIGS. 6 and 7, the motor unit 16 includes a motor 161, a driving element 162, a holder 163, a first joining portion 1641 and a second joining portion 1642 formed in the holder 163, a rotational position sensor 165, and a position sensor 166.

The holder 163 includes a first plate member 1631, a second plate member 1632 and three columnar members 1633 (FIG. 6 shows only two of them) located between the first and second plate members 1631 and 1632 so as to combine these two plate members parallel to and separated from each other. Each of the first and second joining portions 1641 and 1642 is a female-threaded hole formed in the second plate member 32.

The first joining-portion access hole 1721 is a vertically elongated hole having a width which is approximately equal to the diameter of the hole of the first joining portion 1641 and a length which is greater than the diameter of the hole of the first joining portion 1641. The second joining-portion access hole 1722 is a circular hole having a larger diameter than the hole of the second joining-portion 1642.

The motor 161 has its main body fixed to the first plate member 1631. The driving element 162 in the present embodiment is a pinion gear, whose rotation shaft is rotatably supported in a hole formed in the second plate member 1632. The rotation shaft of the motor 161 and that of the driving element 162 are connected by a belt 1612 (see FIG. 7). The belt 1612 is located between the first and second plate members 1631 and 1632.

The rotational position sensor 165 and the position sensor 166 are fixed to the second plate member 1632. The rotational position sensor 165 is a sensor which detects the rotational position of the driving element 162. The position sensor 166 is a sensor which detects the position of a driven element (rack gear) 1811 (which will be described later).

A motor-unit-side power cable (not shown) having a motor-unit-side connector at its end is connected to the motor 161, rotational position sensor 165 and position sensor 166. A power supply circuit for the motor 161, rotational position sensor 165 and position sensor 166 is formed by connecting the motor-unit-side connector to a power-supply-side connector which is provided at the end of a power cable extending from the power unit in the rear-section casing 13.

Figure 8:
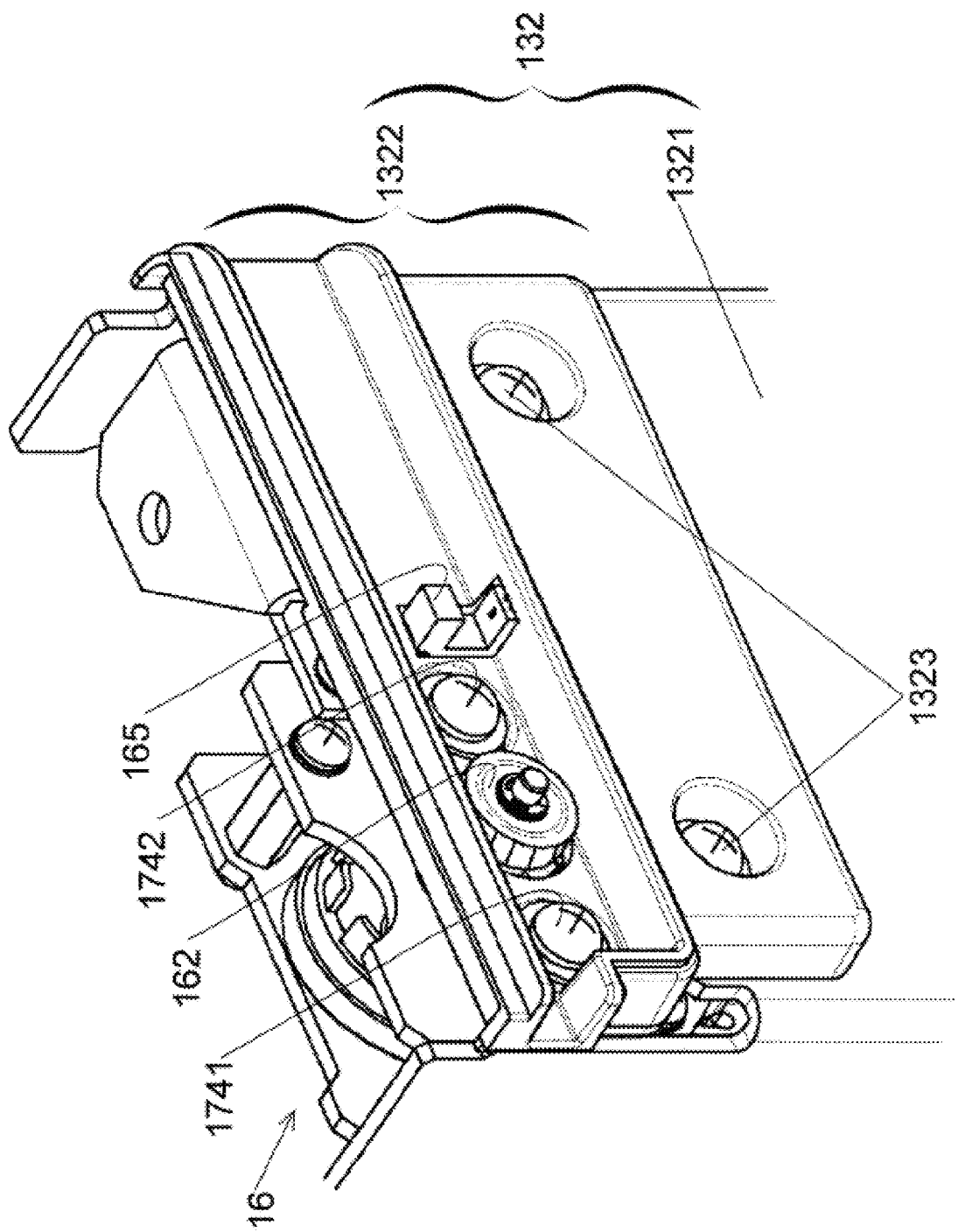
FIG. 8 is a perspective view of the motor unit attached to the rear-section casing.

Each motor unit 16 is fixed to the rear-section left plate 131, rear-section right plate 132 or rear-section top plate 133 by adjusting the position of the first joining portion 1641 of the second plate member 1632 to the first joining-portion access hole 1721 of the rear-section left plate 131 as well as that of the second joining portion 1642 of the second plate member 1632 to the second joining-portion access hole 1722 of the rear-section left plate 131, and tightening male screws 1741 and 1742 passed through the first and second joining-portion access holes 1721 and 1722 into the threaded holes in the first and second joining portions 1641 and 1642, respectively, with the gear of the driving element 162 protruding from the driving-element hole 171 to the outside of the rear-section casing 13 and the position sensor 166 protruding from the sensor hole 173 to the outside of the rear-section casing 13 (FIG. 8 shows the motor unit 16 fixed to the rear-section right plate 132).

Figure 9:
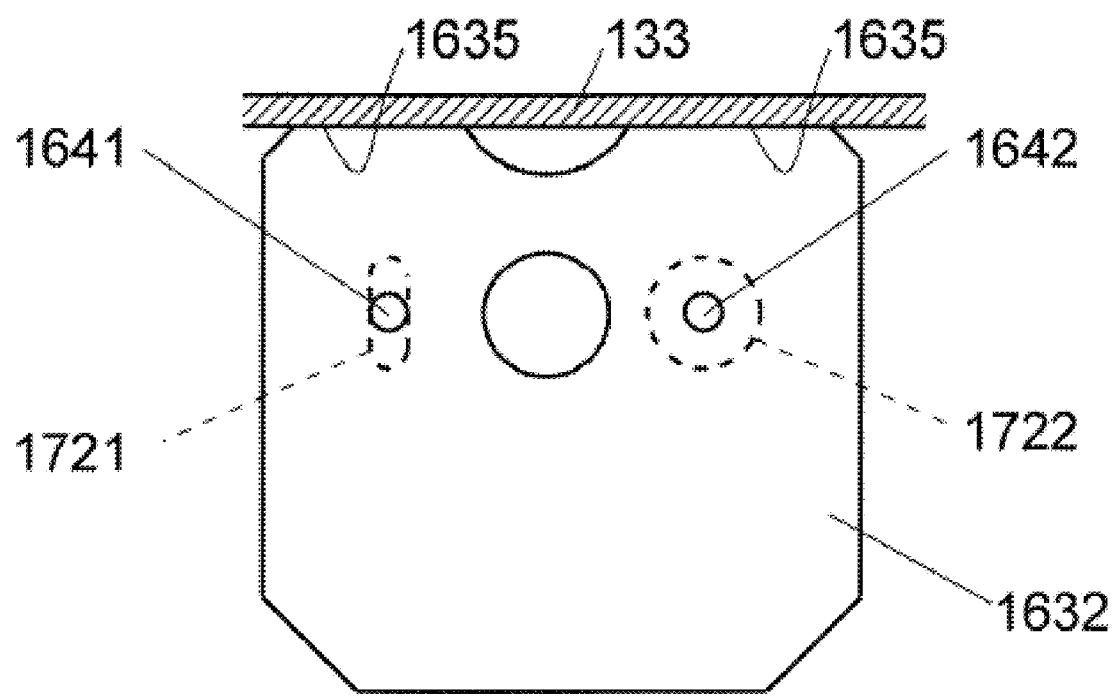
FIG. 9 is a vertical sectional view showing the positional relationship of the second plate member of a holder in the motor unit to the rear-section top plate of the rear-section casing.

In the motor unit 16 thus fixed, the plate surfaces of the first and second plate members 1631 and 1632 are substantially parallel to the vertical direction. The upper ends 1635 of the first and second plate members 1631 and 1632 are in contact with the rear-section top plate 133 (FIG. 9 shows the positional relationship of the second plate member 1632 to the rear-section top plate 133). Therefore, when attaching the motor unit 16 to the rear-section left plate 131, the task of aligning the first joining portion 1641 with the first joining-portion access hole 1721 and the second joining portion 1642 with the second joining-portion access hole 1722 in the vertical direction in FIG. 9 can be easily performed by half-tightening the male screw 1741 passed through the first joining-portion access hole 1721 into the first joining portion 1641 and raising the second plate member 1632 along the elongated hole of the first joining-portion access hole 1721 until its upper end 1635 comes in contact with the rear-section top plate 133. Along with this process, the position sensor 166 and the sensor hole 173 can also be easily aligned with each other.

Another motor unit 16 is attached to the rear-section right plate 132 in a horizontally symmetrical form with the motor unit 16 attached to the rear-section left plate 131. Still another motor unit 16 is attached to the rear-section top plate 133 in such a manner that the entire unit is rotated by 90 degrees with respect to the motor unit 16 attached to the rear-section left plate 131, with its driving element 162 located on the top side.

Figure 10:
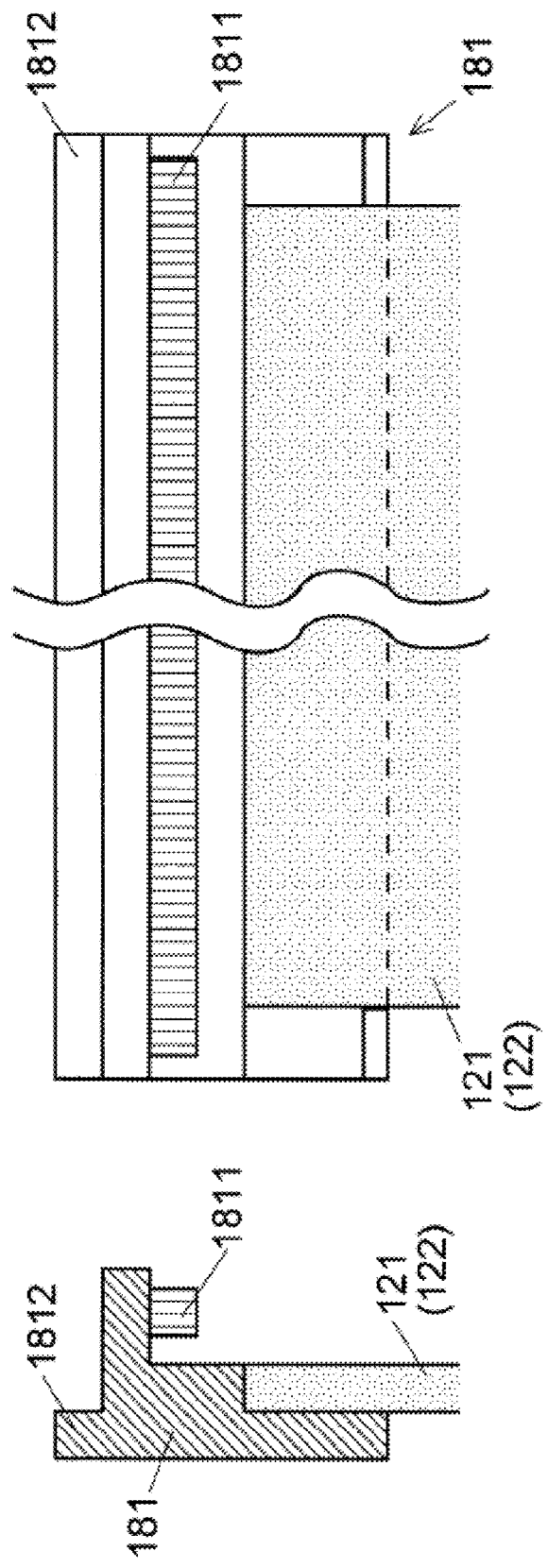
FIG. 10 shows a vertical sectional view (left) and a side view (right) of a lateral belt-like member.

A lateral belt-like member 181 extending in the front-back direction is attached to the upper end of each of the left and right doors 121 and 122 (FIGS. 1 and 10). A driven element 1811 (FIG. 10) is provided on the surface of the lateral belt-like member 181 facing the rear-section casing 13. The driven element 1811 in the present embodiment is a rack gear which is to be engaged with the driving element (pinion gear) 162. In the upper portion of the lateral belt-like member 181, a ridge 1812 (FIG. 10) is provided which is to be fitted in the guide groove formed on the lower surface of each of the left and right frames 1171 and 1172.

An upper belt-like member 182 (FIG. 1) extending in the front-back direction is attached to the lower surface of the top door 123. A driven element (rack gear, not shown) to be engaged with the driving element (pinion gear) 162 is provided on the lower surface of the upper belt-like member 182. A depression 1333 extending in the front-back direction is formed on the upper surface of the damping member 1332 in the rear-section top plate 133. When the top door 123 is slid in the front-back direction, the upper belt-like member 182 slides in the front-back direction in the depression 1333.

The console 14, which is provided in front of the balance unit 11, has a display section 141 and an operation section 142. The display section 141 shows the weight of a weighed sample, various operation menus and other kinds of information. The operation section 142 has multiple buttons. Examples of these buttons include a power on/off button, a reset button for resetting the numerical value of the weight to zero (when a tare is placed on the measuring pan 112, the user presses this reset button and subsequently places a sample on the tare to obtain a net weight value of the sample, with the weight of the tare subtracted), a button for changing the number of digits of the numerical value displayed on the display section 141, a print button (when a printer is connected to the electronic balance 1, the user can press the print button to obtain a print-out of the weight value and other kinds of information), and a button for displaying and switching various menus.

The console 14 also has an open-close button 143 for the user to give an instruction to open/close the left door 121, right door 122 and top door 123. When these doors are closed, pressing the open-close button 143 opens the doors. When these doors are opened, pressing the open-close button 143 closes the doors. In the present embodiment, two open-close buttons 143 are provided, one on the left side from the center of the console 14 and the other on the right side. Pressing any one of the two open-close buttons 143 makes all of the left, right and top doors 121, 122 and 123 simultaneously open or close. Accordingly, the user can press an appropriate one of the two open-close buttons 143 with his/her free hand. It is also possible to provide an open-close button for each door so that the three doors can be individually opened and closed.

In the present embodiment, although the left door 121, right door 122 and top door 123 can be opened and closed automatically by the operation of the open-close buttons 143, they may also be opened and closed by hand. When one of the doors has been manually opened by the user, the controller (not shown) of the electronic balance 1 detects the position of the opened door by means of the rotational position sensor 165 and the position sensor 166. The detected position is stored in a memory section (not shown). At a later point in time, when automatically opening the doors in response to an operation of the open-close buttons 143, the controller reads the stored information of the open position of each door from the memory section and controls the motors 161 so that the doors will come to their respective open positions.

(2) Dealing with Motor Failure in Electronic Balance According to Present Embodiment If one of the motors 161 has broken down during the use of the electronic balance 1 according to the present embodiment, it will be impossible to automatically open and close the corresponding door (left door 121, right door 122 or top door 123) by the operation of the open-close buttons 143. In that case, the task of replacing the motor unit 16 is performed, as will be hereinafter described. This task can be performed on the site where the electronic balance 1 is in use. It is unnecessary to transport the electronic balance 1 to a repair shop.

Initially, the rear-section back plate 134 is removed from the rear-section casing 13 (see FIG. 4). The door having the problem with the automatic open-close operation (left door 121, right door 122 or top door 123) is also removed. The rear-section back plate 134, which is screwed to the other plates of the rear-section casing 13, can be removed by removing the screws. The door can be removed by removing the stopper 125 and pulling the door backward.

Figure 11:
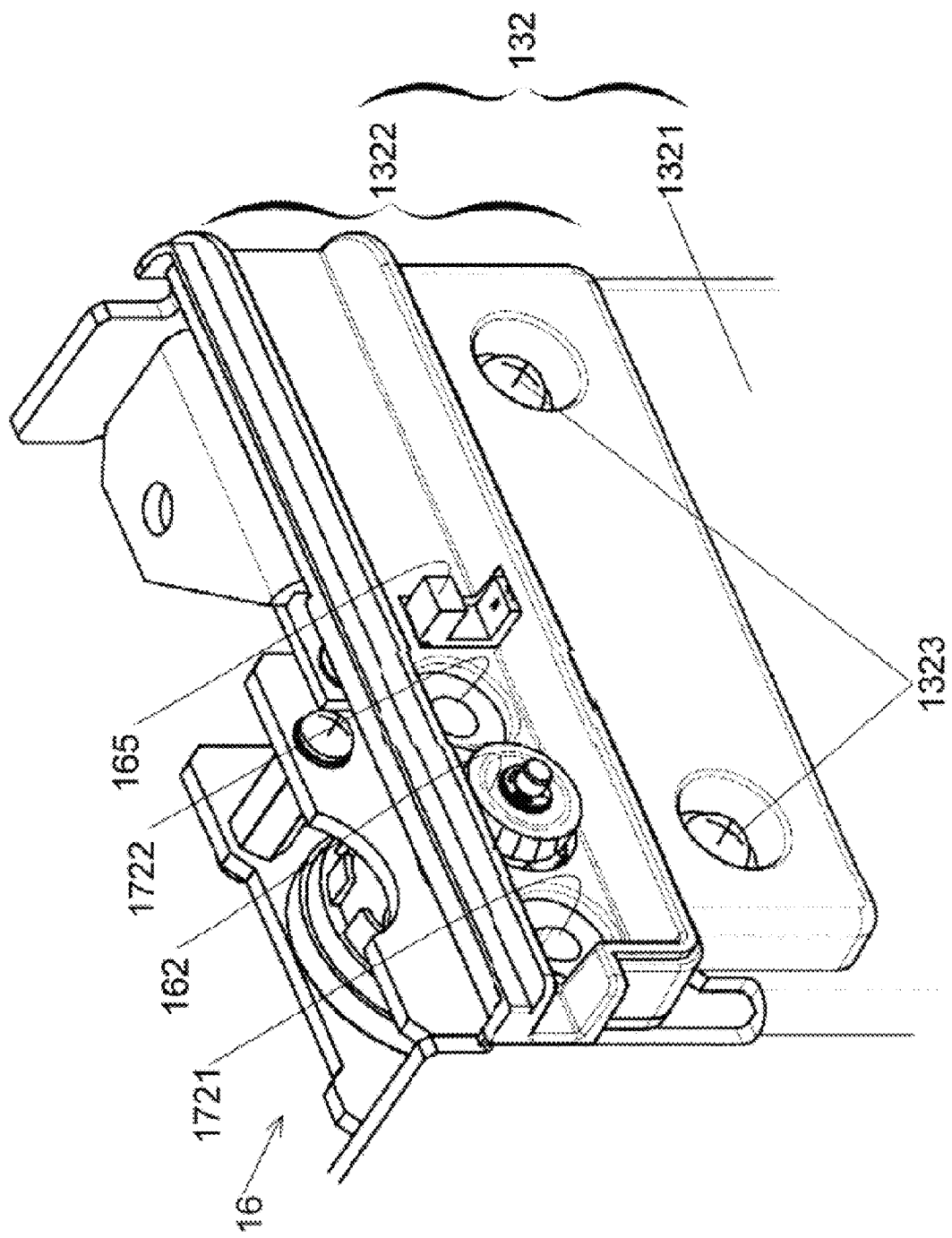
FIG. 11 is a perspective view of the motor unit in the middle of the process of being removed from the electronic balance or being attached to the electronic balance.

With the rear-section back plate 134 thus removed, the maintenance operator can access the inner area of the rear-section casing 13 from behind the same casing 13 and perform necessary tasks by hand. In this situation, the operator disconnects, from the power-supply-side connector, the motor-unit-side connector which is connected to the motor unit 16 that needs to be replaced. Supporting the motor unit 16 by one hand, the operator subsequently removes the male screws 1741 and 1742 with the other hand (FIG. 11). After that, the operator pulls the motor unit 16 toward the inner area of the rear-section casing 13 to remove the driving element 162 and the position sensor 166 from the driving-element hole 171 and the sensor hole 173, respectively, and ultimately removes the entire motor unit 16 through the back area of the rear-section casing 13 to the outside of the same casing 13 (FIG. 5).

Next, the operator places a new motor unit 16 from the back area of the rear-section casing 13 into the same casing 13 and makes the front end 1634 of the first plate member 1631 be in contact with the rear-section front plate 130 of the rear-section casing 13. Furthermore, in the case of attaching the motor unit 16 to the rear-section left plate 131 or rear-section right plate 132, the upper ends of the first and second plate members 1631 and 1632 are also made to be in contact with the rear-section top plate 133. By making the first and second plate members 1631 and 1632 of the new motor unit 16 be in contact with the specific plates of the rear-section casing 13 in this manner, the alignment can be achieved for the driving element 162 and the driving-element hole 171, for the position sensor 166 and the sensor hole 173, for the first joining portion 1641 and the first joining-portion access hole 1721, and for the second joining portion 1642 and the second joining-portion access hole 1722. Maintaining this state, the operator makes the driving element 162 and the position sensor 166 pass through and protrude from the driving-element hole 171 and the sensor hole 173, respectively, to the outside of the rear-section casing 13. Furthermore, the operator inserts the male screws 1741 and 1742 through the first and second joining-portion access holes 1721 and 1722 into the threaded holes of the first and second joining portions 1641 and 1642, respectively, and tightens these screws to fix the new motor unit 16 to the rear-section casing 13. Additionally, the operator connects the motor-unit-side connector of the new motor unit 16 to the power-supply-side connector.

Subsequently, the operator fits the removed door into the guide grooves from behind the rear-section casing 13 and pushes it forward. Through this process, the pinion gear, which is the driving element 162, automatically engages with the rack gear, which is the driven element 1811. Ultimately, the operator replaces the rear-section back plate 134 of the rear-section casing 13 to its original position. Thus, the entire sequence of the replacement work is completed.

As described to this point, in the electronic balance 1 according to the present embodiment, the motor unit 16 which includes the motor 161 and the driving element 162 in an integrated form is attached to the rear-section casing 13. When the motor 16 has broken down, the motor unit 16 including the motor 16 is entirely removed from the rear-section casing 13, and a new motor unit 16 including a new motor 161 and a new driving element 162 in an integrated form is entirely attached to the rear-section casing 13. Since the replacement of the motor 161 (motor unit 16) does not require connecting the motor 161 and the driving element 162, the replacement work can be easily performed.

(3) Modified Examples

The present invention is not limited to the previously described embodiment; it may be changed or modified in various forms.

For example, in the previously described embodiment, all of the three doors, i.e., the left, right and top doors 121, 122 and 123, are automatic doors. It is also possible to configure only one or two of these doors as automatic doors while using a manual door or a fixed plate as the two or one remaining door.

In the previously described embodiment, the belt 1612 is used for the connection between the rotation shaft of the motor 161 and that of the pinion gear (driving element 162). The two rotation shafts may be connected via a different type of rotation-transmitting means, such as a gear system. It is also possible to directly attach the pinion gear to the rotation shaft of the motor 161.

In the previously described embodiment, the pinion gear and the rack gear are used as the driving element 162 and the driven element 1811, respectively. It is possible to use a rubber roller (smooth roller) in place of the pinion gear and a smooth rail (with no gear teeth) in place of the rack gear.

In the previously described embodiment, the alignment of the first joining-portion access hole 1721 and the first joining portion 1641 as well as that of the second joining-portion access hole 1722 and the second joining portion 1642 are achieved by making the front end 1634 of the first and second plate members 1631 and 1632 of the motor unit 16 be in contact with the rear-section front plate 130 as well as making the upper end 1635 be in contact with the rear-section top plate 133. Alternatively, a contact portion which is a member separate from the rear-section casing 13 may be provided on the inner surface of the rear-section casing 13, or a projecting portion may be formed by raising a portion of the inner surface of the rear-section casing 13, in such a manner that the joining-portion access holes will be aligned with the joining portions when a specific portion of the motor unit 16 is in contact with the contact portion or the projecting portion.

In the previously described embodiment, the rear-section left plate 131 and the rear-section right plate 132 each consist of the metal-plate part 1321 and the damping member 1322 (the same also applies to the rear-section top plate 133). For a simpler structure of the rear-section casing 13, the rear-section left plate 131 and other aforementioned plates may be formed by a plate made of a single material.

The rotational position sensor 165 and the position sensor 166 in the previously described embodiment are optional and may be omitted.

[Modes]

A person skilled in the art can understand that the previously described illustrative embodiment is a specific example of the following modes of the present invention.

(Clause 1)

An electronic balance according to Clause 1 includes:

a balance unit including a bottom casing and a measuring pan provided on the top surface of the bottom casing;

a windshield including a front-side plate, a left-side plate, a right-side plate and a top-side plate enclosing a space around the measuring pan, the windshield having a door which is moveable in the front-back direction in the left-side plate, the right-side plate or the top-side plate;

a rear-section casing located at the back of the space, the rear-section casing including a rear-section front plate, a rear-section left plate extending from the left-side plate, a rear-section right plate extending from the right-side plate, and a rear-section top plate extending from the top-side plate, where the rear-section front plate covers the back side of the space, and where a driving-element hole and a joining-portion access hole are formed in the rear-section left plate, the rear-section right plate or the rear-section top plate that corresponds to the left-side plate, the right-side plate or the top-side plate in which the door is provided;

a motor unit including a motor, a driving element connected with the rotation shaft of the motor, and a joining portion which is fixed relative to the main body of the motor, where the motor unit is configured to be removably arranged within the rear-section casing so that the driving element protrudes through the driving-element hole to the outside of the rear-section casing while the joining portion is located at a position corresponding to the joining-portion access hole; and a driven element fixed to the door and configured to be driven by the driving element in the front-back direction.

In the electronic balance according to Clause 1, a motor unit which includes a motor and a driving element in an integrated form is attached to the rear-section casing of the electronic balance. When the motor has broken down, the motor unit including the old motor and the old driving element can be entirely removed from the rear-section casing, and a new motor unit including a new motor and a new driving element in an integrated form can be entirely attached to the rear-section casing. Thus, the replacement of the motor can be easily performed.

As for the driving element, for example, a pinion gear may be used, in which case a rack gear may be used as the driven element. It is also possible to use a smooth roller (with no gear teeth) as the driving element and a smooth rail (with no gear teeth) as the driven element. The driving element may be directly connected to the rotation shaft of the motor or indirectly connected via a gear, belt or other types of transmission.

(Clause 2)

In the electronic balance according to Clause 2, which is one mode of the electronic balance according to Clause 1, the motor unit further includes a holder which holds the main body of the motor, the joining portion is provided in the holder, and a contact portion which the holder comes in contact with when the joining portion is aligned with the joining-portion access hole is formed on an inner surface of the rear-section casing.

In the electronic balance according to Clause 2, when the motor unit is to be attached, the alignment of the joining portion with the joining-portion access hole can be easily achieved by making the holder be in contact with the contact portion.

The contact portion may be a member which is separate from the rear-section casing and is attached to the inner surface of the same casing, or it may be a projecting portion formed by raising a portion of the inner surface of the rear-section casing. In the case where the joining-portion access hole is formed in the rear-section left plate or the rear-section right plate, the inner surface of the rear-section top plate (facing the inside of the rear-section casing) may be used as the contact portion. In the case where the joining-portion access hole is formed in the rear-section top plate, the inner surface of the rear-section left plate or that of the rear-section right plate may be used as the contact portion.

(Clause 3)

In the electronic balance according to Clause 3, which is one mode of the electronic balance according to Clause 1 or 2, the motor unit further includes a rotational position sensor configured to detect the rotational position of the driving element.

The electronic balance according to Clause 3 can determine the position of the door by detecting the rotational position of the driving element with the rotational position sensor. Since the rotational position sensor is included in the motor unit, it is unnecessary to perform the positional adjustment of the driving element and the rotational position sensor. This facilitates the task of attaching the driving element and the rotational position sensor.

(Clause 4)

In the electronic balance according to Clause 4, which is one mode of the electronic balance according to one of Clauses 1-3, the motor unit further includes a position sensor configured to detect the position of the driven element.

The electronic balance according to Clause 4 can determine the position of the door by detecting the position of the driven element with the position sensor. Since the position sensor is included in the motor unit, it is unnecessary to perform the positional adjustment of the driven element and the position sensor. This facilitates the task of attaching the position sensor.

The rotational position sensor in the electronic balance according to Clause 3, or the position sensor in the electronic balance according to Clause 4, may be provided within the rear-section casing or outside the same casing. In the case of providing the rotational position sensor or the position sensor within the rear-section casing, a hole may be formed in the rear-section casing, and the sensor may be configured to detect, through that hole, the position of the rotational position of the driving element or the position of the driven element located outside the rear-section casing. In the case of providing the rotational position sensor within the rear-section casing, the sensor may be configured to detect the rotational position of the rotation shaft of the driving element at a portion of the rotation shaft located within the rear-section casing. In the case of providing the rotational position sensor or/and the position sensor outside the rear-section casing, a hole or holes may be formed in the rear-section casing, the rotational position sensor or/and the position sensor may be arranged to protrude through the hole or holes to the outside of the same casing.

(Clause 5)

In the electronic balance according to Clause 5, which is one mode of the electronic balance according to one of Clauses 1-4, a portion of the rear-section casing is a damping member in which vibrations due to the rotation of the motor are less likely to occur than in other portions of the rear-section casing, and the joining-portion access hole is provided in the damping member.

When the motor is working to open or close the door, vibrations occur from the motor. If these vibrations are transmitted to the rear-section casing and further to the balance unit, they will cause a considerable amount of noise as well as interfere with the weighing operation. In the electronic balance according to Clause 5, since the joining-portion access hole is provided in the damping member, the vibrations of the motor are less likely to be transmitted through the joining portion to the entirety of the rear-section casing and the balance unit, whereby the amount of noise is reduced, and the interference with the weighing operation is also prevented.

For example, when the parts of the rear-section casing except for the damping member are aluminum-alloy plates, a plastic plate can be used as the damping member. In that case, the ease of occurrence of the vibrations depends on not only the kinds of materials of the damping member and other parts but also their thicknesses. By taking these factors into account, the configuration of the damping member and other parts of the rear-section casing can be appropriately determined.

REFERENCE SIGNS LIST

1 . . . Electronic Balance
11 . . . Balance Unit
111 . . . Bottom Casing
112 . . . Measuring Pan
113 . . . Space Around Measuring Pan
114 . . . Guide Groove
1151 . . . Left Front Pillar
1152 . . . Right Front Pillar
116 . . . Front Frame
1171 . . . Left Frame
1172 . . . Right Frame
12 . . . Windshield
120 . . . Front-Side Plate
121 . . . Left Door
122 . . . Right Door
123 . . . Top Door
124 . . . Handle
125 . . . Stopper
13 . . . Rear-Section Casing
130 . . . Rear-Section Front Plate
131 . . . Rear-Section Left Plate
132 . . . Rear-Section Right Plate
1321, 1331 . . . Metal-Plate Part
1322, 1332 . . . Damping Member
1323 . . . Screw
133 . . . Rear-Section Top Plate
1333 . . . Depression
134 . . . Rear-Section Back Plate
14 . . . Console 141 . . . Display Section
142 . . . Operation Section
143 . . . Open-Close Button
15 . . . Static Eliminator
16 . . . Motor Unit
161 . . . Motor
162 . . . Driving Element (Pinion Gear)
163 . . . Holder
1631 . . . First Plate Member
1632 . . . Second Plate Member
1633 . . . Columnar Member
1634 . . . Front End
1635 . . . Upper End
1641 . . . First Joining Portion
1642 . . . Second Joining Portion
165 . . . Rotational Position Sensor
166 . . . Position Sensor
171 . . . Driving-Element Hole
1721 . . . First Joining-Portion Access Hole
1722 . . . Second Joining-Portion Access Hole
173 . . . Sensor Hole
1741, 1742 . . . Male Screw
181 . . . Lateral Belt-Like Member
1811 . . . Driven Element (Rack Gear)
1812 . . . Ridge
182 . . . Upper Belt-Like Member

The invention claimed is:

1. An electronic balance, comprising:
a balance unit including a bottom casing and a measuring pan provided on a top surface of the bottom casing;
a windshield including a front-side plate, a left-side plate, a right-side plate and a top-side plate enclosing a space around the measuring pan, the windshield having a door which is moveable in a front-back direction in the left-side plate, the right-side plate or the top-side plate;
a rear-section casing located at a back of the space, the rear-section casing including a rear-section front plate, a rear-section left plate extending from the left-side plate, a rear-section right plate extending from the right-side plate, and a rear-section top plate extending from the top-side plate, where the rear-section front plate covers a back side of the space, and where a driving-element hole and a joining-portion access hole are formed in the rear-section left plate, the rear-section right plate or the rear-section top plate that corresponds to the left-side plate, the right-side plate or the top-side plate in which the door is provided;
a motor unit including a motor, a driving element connected with a rotation shaft of the motor, and a joining portion which is fixed relative to a main body of the motor, where the motor unit is configured to be removably arranged within the rear-section casing so that the driving element protrudes through the driving-element hole to an outside of the rear-section casing while the joining portion is located at a position corresponding to the joining-portion access hole; and
a driven element fixed to the door and configured to be driven by the driving element in the front-back direction.

2. The electronic balance according to claim 1, wherein:
the motor unit further includes a holder which holds the main body of the motor;
the joining portion is provided in the holder; and
a contact portion which the holder comes in contact with when the joining portion is aligned with the joining-portion access hole is formed on an inner surface of the rear-section casing.

3. The electronic balance according to claim 1, wherein the motor unit further includes a rotational position sensor configured to detect a rotational position of the driving element.

4. The electronic balance according to claim 1, wherein the motor unit further includes a position sensor configured to detect a position of the driven element.

5. The electronic balance according to claim 3, wherein the motor unit further includes a position sensor configured to detect a position of the driven element.

6. The electronic balance according to claim 1, wherein:
a portion of the rear-section casing is a damping member in which vibrations due to a rotation of the motor are less likely to occur than in other portions of the rear-section casing; and
the joining-portion access hole is provided in the damping member.

* * * * *